(12) United States Patent
Zhou et al.

(10) Patent No.: US 9,525,563 B2
(45) Date of Patent: Dec. 20, 2016

(54) FORWARDING PACKETS IN AN EDGE DEVICE

(71) Applicant: Hangzhou H3C Technologies Co., Ltd., Hangzhou (CN)

(72) Inventors: Wan Zhou, Beijing (CN); Xianzhi Guo, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 65 days.

(21) Appl. No.: 14/373,769

(22) PCT Filed: Mar. 28, 2013

(86) PCT No.: PCT/CN2013/073337
§ 371 (c)(1),
(2) Date: Jul. 22, 2014

(87) PCT Pub. No.: WO2013/143472
PCT Pub. Date: Oct. 3, 2013

(65) Prior Publication Data
US 2015/0030031 A1    Jan. 29, 2015

(30) Foreign Application Priority Data

Mar. 28, 2012  (CN) .......................... 2012 1 0085781

(51) Int. Cl.
*H04L 12/46*  (2006.01)

(52) U.S. Cl.
CPC ....... *H04L 12/4625* (2013.01); *H04L 12/4645* (2013.01); *H04L 12/4666* (2013.01)

(58) Field of Classification Search
None
See application file for complete search history.

(56) References Cited

U.S. PATENT DOCUMENTS

| 2006/0245436 | A1  | 11/2006 | Sajassi |
| 2006/0245439 | A1* | 11/2006 | Sajassi ............... H04L 12/2881 370/400 |
| 2008/0019385 | A1  | 1/2008  | Sultan et al. |

(Continued)

FOREIGN PATENT DOCUMENTS

| CN | 1431786 | 7/2003 |
| CN | 1820463 | 8/2006 |

(Continued)

OTHER PUBLICATIONS

International Search Report and Written Opinion dated Jul. 4, 2013 issued on PCT Patent Application No. PCT/CN2013/073337 dated Mar. 28, 2013, The State Intellectual Property Office, the P.R. China.

*Primary Examiner* — Donald Mills
(74) *Attorney, Agent, or Firm* — Hewlett Packard Enterprise Patent Department

(57) ABSTRACT

An edge device searches a MAC table to obtain information of a public network egress interface for a packet which is to be sent from a local site to a remote site to access a service, replaces a VLAN ID in the packet with a VLAN ID used for transmission in a public network, and sends the packet in which the VLAN ID has been replaced to a remote site according to the information of the public network egress interface.

12 Claims, 13 Drawing Sheets

(56) References Cited

U.S. PATENT DOCUMENTS

| | | | | |
|---|---|---|---|---|
| 2011/0090911 A1* | 4/2011 | Hao | ................... | H04L 12/4633 |
| | | | | 370/395.53 |
| 2011/0268125 A1* | 11/2011 | Vobbilisetty | ............ | H04L 45/46 |
| | | | | 370/395.53 |
| 2012/0177039 A1* | 7/2012 | Berman | ................... | H04L 45/02 |
| | | | | 370/390 |
| 2012/0243539 A1* | 9/2012 | Keesara | ................... | H04L 45/66 |
| | | | | 370/392 |

FOREIGN PATENT DOCUMENTS

| | | |
|---|---|---|
| CN | 101047600 | 10/2007 |
| CN | 102316030 | 1/2012 |
| CN | 102594711 | 7/2012 |

\* cited by examiner

US 9,525,563 B2

FORWARDING PACKETS IN AN EDGE DEVICE

CLAIM FOR PRIORITY

The present application is a national stage filing under 35 U.S.C 371 of PCT application number PCT/CN2013/073337, having an international filing date of Mar. 28, 2013, which claims priority to China application number 201210085781.X having a filing date of Mar. 28, 2012, the disclosures of which are hereby incorporated by reference in their entireties.

BACKGROUND

Currently, multiple private networks (or sites) communicate with each other via a public network. These communications are typically made through tunnels over the public network between the sites. Particularly, an edge device in each of the sites is used to forward packets to the edge devices in the other sites via tunnels over the public network.

In network planning, in which all of the sites are known, virtual local area networks (VLANs) of all of the sites are typically configured uniformly to have the same service configured in the same VLAN. For example, when a web service is configured in VLAN100 in site 1, the web service is typically also configured in VLAN100 in site 2 and site 3, respectively.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
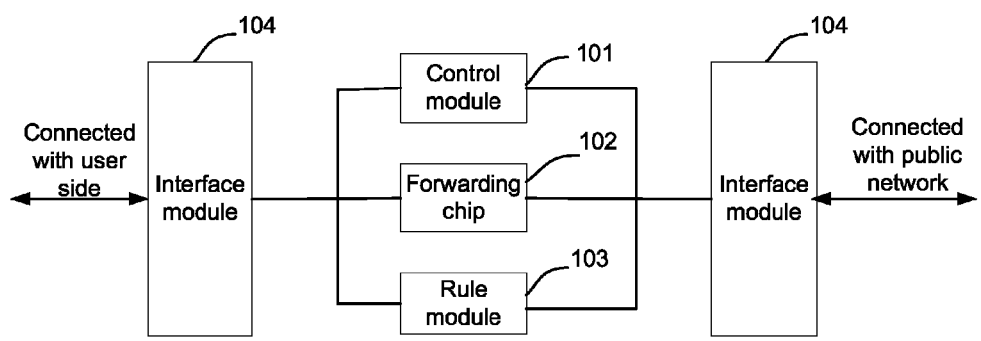
FIG. 1 is a schematic diagram illustrating an inner structure of an edge device in accordance with an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

In practice, because existing sites are generally planned and maintained individually and interoperabilities with other sites are not taken into consideration, the same service may have been configured into different VLANs. For example, a web service may be configured in VLAN100 in site 1 and VLAN200 in site 2. In this situation, if site 1 and site 2 were connected with each other via a public network, site 1 is not able to access site 2 for the web service. In order to enable site 1 to be able to access site 2 for the web service, re-planning of at least one of site 1 and site 2 may be required, which may require massive workload and may result in interruption of existing services.

According to an example, disclosed herein is a method for forwarding packets in an edge device, which may be applicable in a system where layer-2 interconnections between sites are implemented by virtual links. In the method an edge device may search a media access control (MAC) table to obtain information of a public network egress interface for a packet which is to be sent from a local site to a remote site to access a service. In addition, the method may include searching in a VLAN mapping relation table and replacing a VLAN ID in the packet with a VLAN ID, which may be used to transmit a packet of the service in a public network, in which each item of the VLAN mapping relation table associates a VLAN ID used in the local site for packets of a service with a VLAN ID used for transmitting packets of the service in the public network. The method may further include sending the packet in which the VLAN ID has been replaced to the remote site by using the information of the public network egress interface.

According to an example, disclosed herein is an edge device that is applicable in a system where layer-2 interconnections between sites are implemented by virtual links. The edge device may include a control module, a forwarding chip, an interface module, and a rule module.

The forwarding chip may search a media access control (MAC) table to obtain information of a public network egress interface for a packet which is to be sent from a local site to a remote site to access a service. The forwarding chip may search in the VLAN mapping relation table in the rule module, and replace a VLAN ID in the packet with a VLAN ID that is used for transmitting packets of the service in the public network.

The rule module may store the VLAN mapping relation table, in which each item of the VLAN mapping relation table associates a VLAN ID used in the local site for packets of a service with a VLAN ID used for transmitting packets of the service in the public network.

The interface module may send the packet, in which the VLAN ID has been replaced to the remote site by using the information of the public network egress interface.

In an example, layer-2 interconnections between the sites are implemented by virtual links. An edge device may map a VLAN ID of a first site to a VLAN ID of a second site so as to enable the second site to perform operations on the same service, thereby enabling different sites to exchange inter-VLAN access for the same service.

As shown in FIG. 1, an edge device may include a control module 101, a forwarding chip 102, a rule module 103, and a plurality of interface modules 104. The control module 101 may be implemented by hardware such as a CPU. The forwarding chip 102 may be a conventional forwarding chip that stores a MAC hardware table, and may mainly perform address lookup for packet forwarding. The rule module 103 may store a VLAN mapping relation table. The interface modules 104 mainly refer to external interfaces of the edge device, i.e., interfaces that are connected with other devices.

According to an example, when an edge device is to send a packet from the local site to a remote site to access a service, the forwarding chip 102 may search the MAC table according to the packet to obtain information of a public network egress interface. The forwarding chip 102 may also search in the VLAN mapping relation table in the rule module 103, replace a VLAN ID in the packet with a VLAN ID used for transmitting packets of the service in the public network, and send the packet in which the VLAN ID has been replaced to the remote site via an interface module 104 identified by the information of the public network egress interface (i.e., a public network egress interface). Accordingly, after the edge device receives a packet sent by a remote site to the local site to access a service, the forwarding chip 102 may search in the VLAN mapping relation table in the rule module 103, replace a VLAN ID in the packet with a VLAN ID used in the local site for packets of the service, and send the packet in which the VLAN ID has been replaced to the local site via an interface module 104. When the VLAN ID used for transmitting packets of the service in the public network is identical to the VLAN ID used in the local site for packets of the service, the packet may be directly forwarded. Thus, according to this example, VLANs of different sites may be mapped to each other, e.g. a VLAN ID in a packet which is to be sent from a local site to a remote site, is mapped to another value before the packet is transmitted in the public network. This may enable a remote site to identify a service requested by a local site, even when the remote and local sites use different VLAN IDs for that service. In this way, by mapping the VLANs, inter-VLAN layer-2 communications between different sites may be facilitated.

Several examples are described in more detail below.

In a first example, the edge device is an edge device (ED) in an Ethernet virtualization interconnection (EVI) network. An EVI network is a network that links private networks such as multiple data centers deployed at different geographical locations so as to realize load balancing and higher reliability by enabling a virtual machine to shift freely between the data centers.

Figure 2:
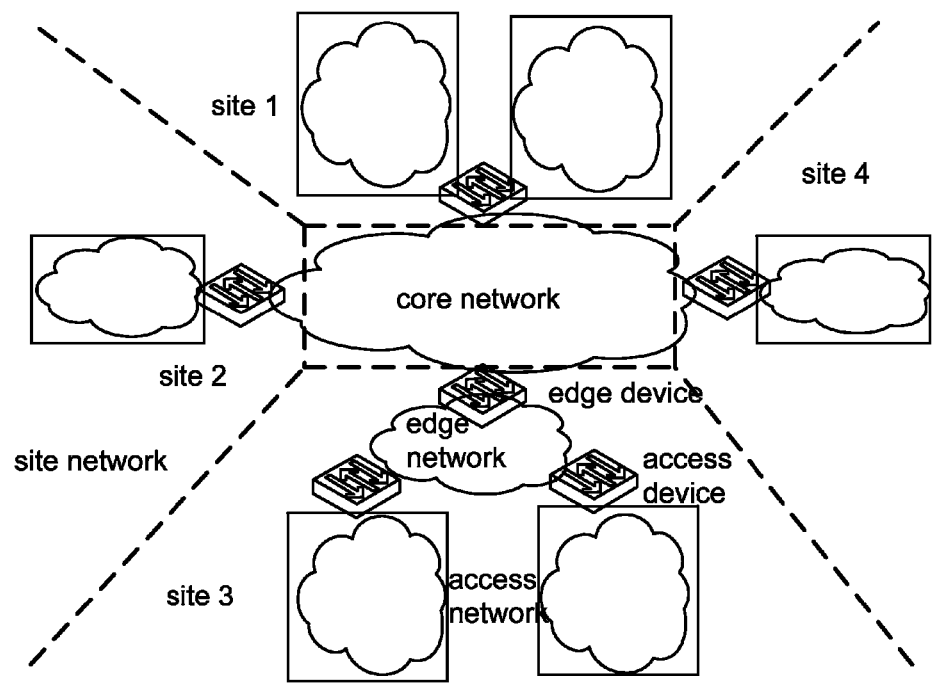
FIG. 2 is a schematic diagram illustrating an Ethernet virtual interconnection (EVI) network in accordance with an example of the present disclosure.

FIG. 2 is a schematic diagram illustrating an EVI network, according to an example. As shown in FIG. 2, the EVI network may include a core network and a plurality of site networks. The site networks may be data centers deployed at different locations, and are private networks. The core network is a public network. The multiple private networks are inter-connected by the public network. A site network may include an edge network and an access network. The edge network refers to the network between converging devices and edge devices, and the access network refers to the network between access devices and converging devices. Similar to conventional virtual network techniques such as VPLS and the like, EVI may be used for implementing extended functions of virtual local area network (VLAN) between different sites. The extended VLANs form independent EVI network instances, and different EVI instances have respective intra-VLAN forwarding schemes independent from each other. The EVI of this example may be different from techniques such as VPLS and the like.

Figure 3:
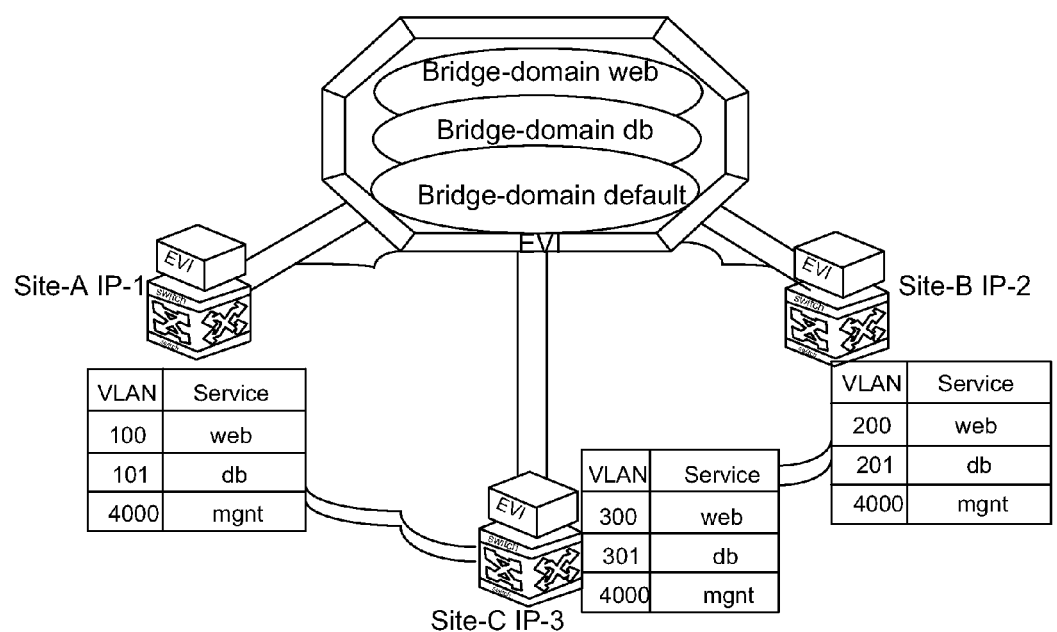
FIG. 3 is a schematic diagram illustrating a planned bridge-domain in accordance with an example of the present disclosure.

An edge device may include multiple EVI instances, and each EVI instance may include multiple bridge-domains. A service at the local site and the same service at a remote site belong to the same bridge-domain, which implements exchange functions to enable service interoperability between the local site and a remote site. In practice, it may be provisioned that some services need VLAN mapping while other services do not need VLAN mapping. Services that need VLAN mapping may have respective VLANs configured according to the services, and the services that do not need VLAN mapping may have respective VLANs configured to belong to a default bridge-domain (also referred to as bridge-domain default). As shown in FIG. 3, suppose sites A, B, and C all support a web service, a database (db) service, and a network management (mgnt) service. The mgnt service may belong to the bridge-domain default, and the corresponding VLAN ID is VLAN4000. By way of particular example, site A implements the web service in VLAN100, the db service in VLAN101, and default services including the mgnt service in VLAN4000; site B implements the web service in VLAN200, the db service in VLAN201, and default services including the mgnt service in VLAN4000; site C implements the web service in VLAN300, the db service in VLAN301, and default services including the mgnt service in VLAN4000. In another example, bridge-domains are divided into a bridge-domain web where web services of all the sites are inter-connected, a bridge-domain db where db services of all the sites are inter-connected, and a bridge-domain default where mgnt services of all the sites are inter-connected.

Firstly, VLAN mapping relations may be statically configured in edge devices of each site. For example, the VLAN mapping relations configured in an edge device of site A may be as shown in Table 1:

TABLE 1

| VLAN | Service | Domain | MAP-VLAN |
|---|---|---|---|
| 100 | Web | Bridge-Domain web | 1000 |
| 101 | Db | Bridge-Domain db | 2000 |
| 4000 | Mgnt | Bridge-Domain default | 3000 |

In Table 1, the "Service" column lists each service type, the "VLAN" column lists the VLAN ID used in site A for each service, the "Domain" column lists the bridge-domain to which each service belongs, and the "MAP-VLAN" column lists the VLAN to which each local VLAN is mapped, i.e., the VLAN ID used for transmitting the service in the public network. The VLAN used for transmitting each service in the public network may be configured statically in the devices.

Likewise, the VLAN mapping relations configured in an edge device of site B may be as shown in Table 2:

TABLE 2

| VLAN | Service | Domain | MAP-VLAN |
|---|---|---|---|
| 200 | Web | Bridge-Domain web | 1000 |
| 201 | Db | Bridge-Domain db | 2000 |
| 4000 | Mgnt | Bridge-Domain default | 3000 |

The VLAN mapping relations configured in an edge device of site C may be as shown in Table 3:

TABLE 3

| VLAN | Service | Domain | MAP-VLAN |
|---|---|---|---|
| 300 | Web | Bridge-Domain web | 1000 |
| 301 | Db | Bridge-Domain db | 2000 |
| 4000 | Mgnt | Bridge-Domain default | 3000 |

After the VLAN mapping relations have been configured, each edge device may send the VLAN mapping relations to a public network egress interface manually or by using protocols such as the intermediate system to intermediate system (ISIS) protocol. A public network egress interface may be an egress interface of a tunnel, may be a logic interface, and may generally include information such as a tunnel header, an egress interface of the public network, and so on. The VLAN mapping relations sent to the public network egress interface may actually be sent to the rule module 103 and stored there together with information identifying the public network egress interface to which the relations were sent. The public network egress interface may be a public network logic interface via which the service may flow out.

Edge devices may perform a MAC study before performing communications. In practice, an edge device may study MAC by using a certain protocol, and may need assistance of other components such as the control module 101, etc. The MAC study may include a study of MAC addresses in the local site and a study of MAC addresses in a remote site. The study of MAC addresses in the local site may follow a conventional study process, e.g., in a VLAN, an interface belonging to the VLAN receives a packet from a local site, parses the packet to obtain information including a VLAN ID, a source MAC address and so on, records and stores the VLAN ID, the source MAC address, and the interface from which the packet was received into a MAC table in the local device. Besides storing MAC addresses studied in the MAC table in local devices, the local site may also send the MAC addresses to remote sites.

After an edge device has studied local MAC addresses in a local VLAN corresponding to a service, the control module 101 may determine information to be sent, which may include at least the VLAN ID corresponding to the service in the local site and the local MAC addresses studied. The control module 101 may also search in a VLAN mapping relation table, replace the VLAN ID used in the local site in the information to be sent with the VLAN ID used for transmitting packets of the service in the public network, and send the information to be sent to a remote site via an interface module 104. Information of a remote site may be obtained through negotiation using the EVI neighbor discovery protocol (ENDP). A virtual Ethernet link linking the local site with the remote site may be established after the negotiation is completed.

After an edge device receives MAC information sent by a remote site, the control module 101 may search in the VLAN mapping relation table, identify a VLAN ID used in the local site that corresponds to a VLAN ID, which is in the received information and which is used for transmitting packets of a service in the public network, and send the MAC information of the remote site to a VLAN corresponding to the VLAN ID used in the local site.

Figure 4:
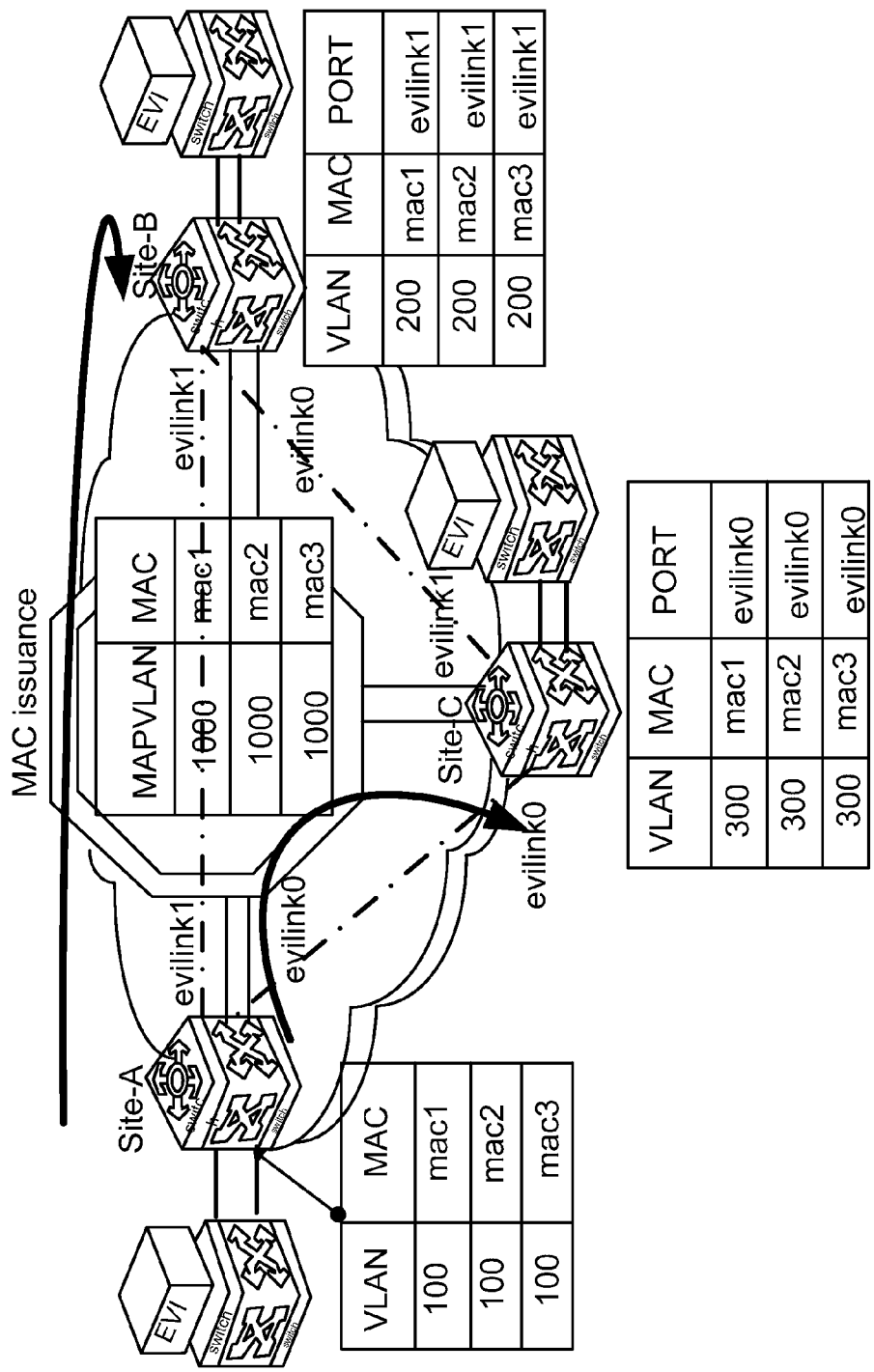
FIG. 4 is a schematic diagram illustrating distributed MAC in accordance with an example of the present disclosure.

As shown in FIG. 4, after studying mac1 in local VLAN100, an edge device of site A may determine that VLAN100 is used in the local site and the MAC is mac1, the information to be sent may include VLAN100 and mac1.

The control module 101 may replace the VLAN100 in the information to be sent with VLAN1000 according to Table 1 to enable the edge device of the remote site to obtain the information correctly, then may send the information to the edge device of the remote site via the interface module 104.

The information obtained by the edge device of site B from the information sent by the edge device of site A may include VLAN1000 and mac1. The edge device of site B may determine that the VLAN1000 is mapped to VLAN200 according to Table 2, and may send mac1 to the forwarding chip 103 for the local VLAN200. Likewise, the edge device of site A may also study MAC information sent by site B.

After the MAC study, the sites may be able to implement inter-VLAN communications.

Figure 5:
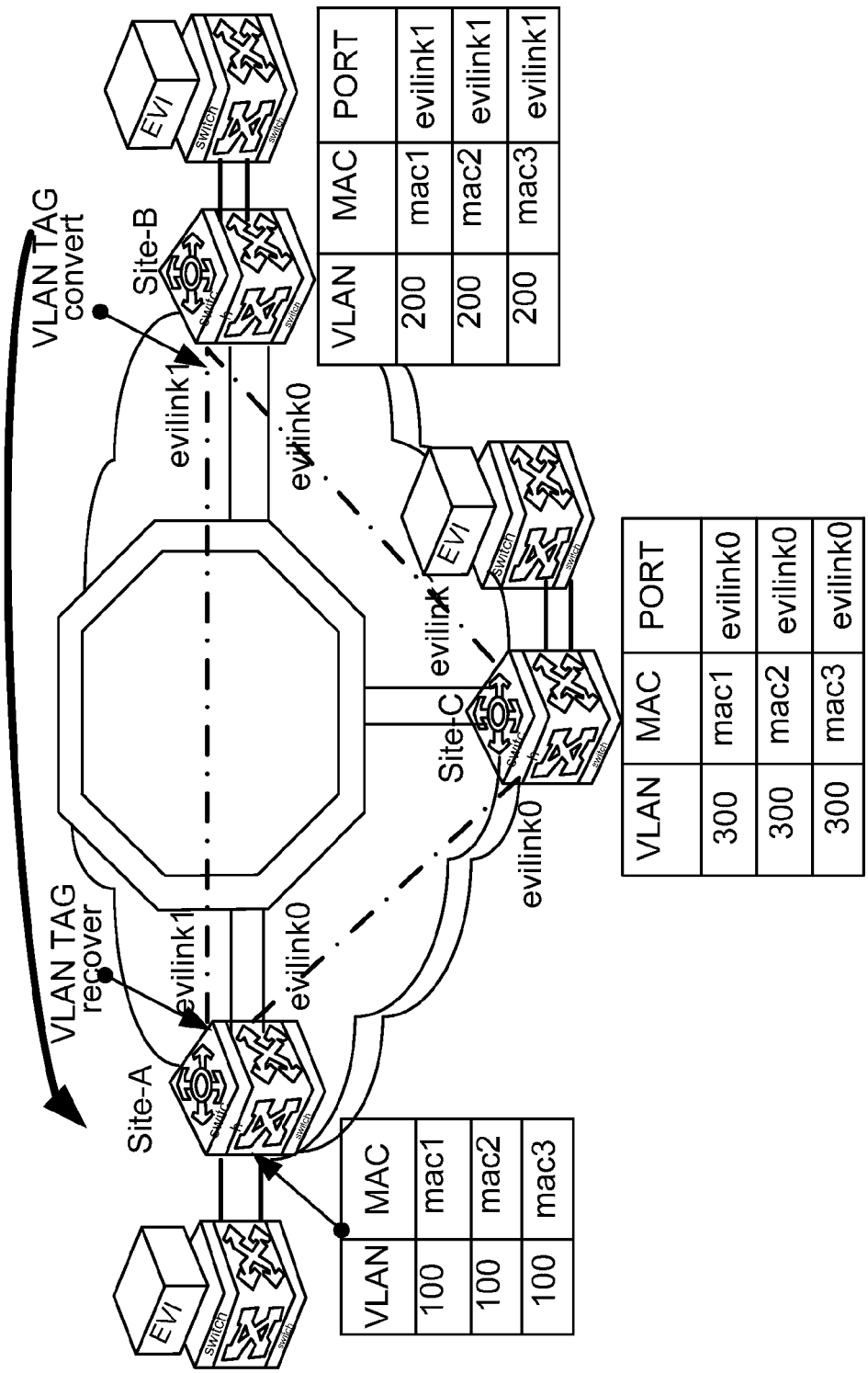
FIG. 5 is a schematic diagram illustrating site B accessing site A for accessing a web service in accordance with an example of the present disclosure.

With reference now to FIG. 5, there is shown an example process in which the sites perform communications by taking the process of site B accessing site A for the web service as an example. In an example, the edge device of site A has studied local MAC addresses (including mac1, mac2, mac3) from VLAN 100, and after performing VLAN mapping, sends the MAC addresses studied to the edge device of site B and site C by using the ISIS protocol. After having studied the MAC addresses sent by the edge device of site A, the edge device of site B delivers the studied MAC addresses to VLAN200, and determines that the public network egress interface is evilink1. Likewise, after studying the MAC sent by the edge device of site A, the edge device of site C delivers the studied MAC addresses to VLAN300, and specifies that the public network egress interface is evilink0.

Figure 11A:
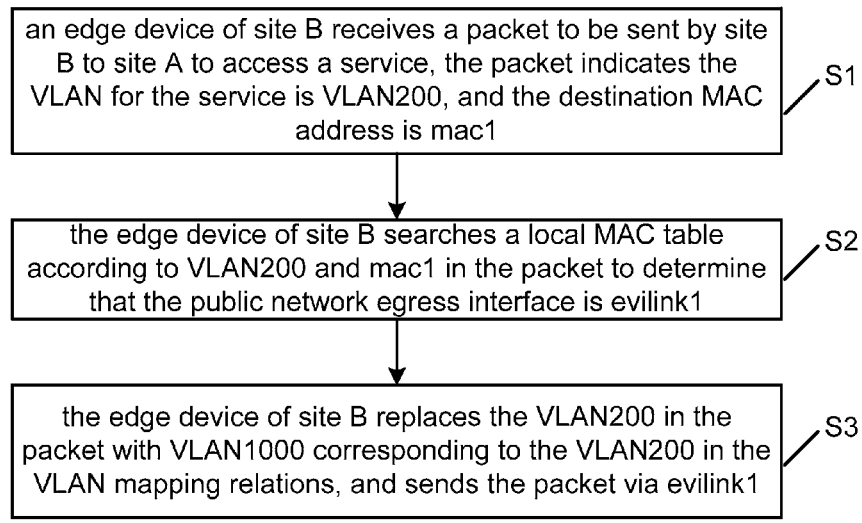
FIG. 11a and FIG. 11b are flowcharts illustrating a process performed in site B and in site A respectively when site B seeks to access site A for a service in accordance with an example of the present disclosure.

In addition, when site B is to access site A for the web service, the following process as shown in FIG. 11a may be performed. In S1, an edge device of site B may receive a packet to be sent by site B to site A to access a service. The packet indicates the VLAN for the service is VLAN200, and the destination MAC address is mac1.

In S2, the edge device of site B may search a local MAC table according to VLAN200 and mac1 in the packet to determine that the public network egress interface is evilink1. As described above, the public network egress interface may be a logic interface that may include information of a tunnel header, a public network egress interface, and so on.

In S3, the edge device of site B may replace the VLAN200 in the packet with VLAN1000 corresponding to the VLAN200 in the VLAN mapping relations as shown in Table 2. Operations such as tunnel encapsulation and the like may be performed before the packet is transmitted to the public network. Therefore, the edge device of site B may need to perform tunnel encapsulation on the packet in which the VLAN ID has been replaced and send the encapsulated packet via the public network egress interface (evilink1). The tunnel encapsulation may adopt any conventional technique, such as Generic Routing Encapsulation (GRE) tunnel encapsulation.

Figure 11B:
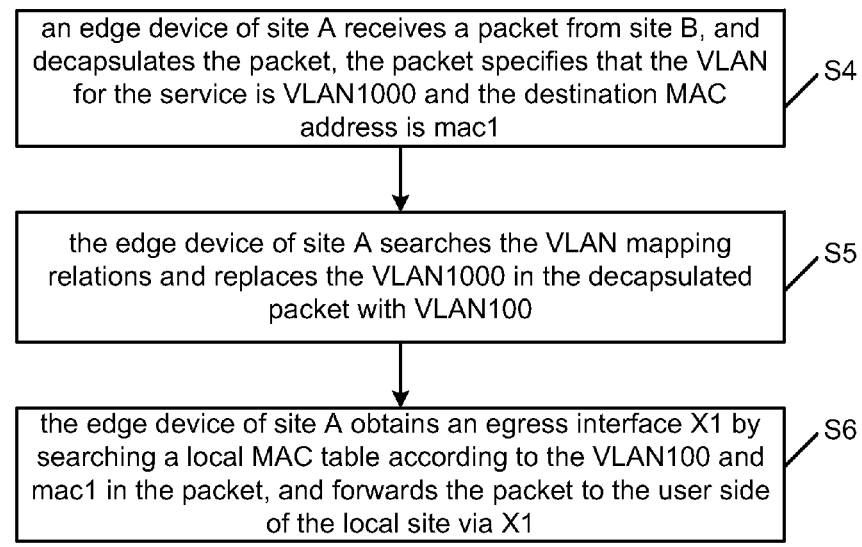

Accordingly, the process of the edge device of site A receiving an access from site B for the web service may be as follows as shown in FIG. 11b. In S4, an edge device of site A may receive a packet from site B, and may decapsulate the packet. The packet specifies that the VLAN for the service is VLAN1000, and that the destination MAC address is mac1.

In S5, the edge device of site A may search the VLAN mapping relations as shown in Table 1, and may replace the VLAN1000 in the decapsulated packet with VLAN100. In S6, the edge device of site A may send the packet in which the VLAN ID has been replaced to the local site, i.e., may obtain an egress interface X1 by searching a local MAC table according to the VLAN100 and mac1 in the packet, and may forward the packet to the user side of the local site via the egress interface X1. It should be noted that the egress interface X1 is a physical interface that is connected with the user side of the local site, and is different from the public network egress interface mentioned in S2.

The above procedures S1 to S6 describe a process of sites located at different locations implementing inter-VLAN layer-2 communication for a service. In practice, the packet to access the service may be a unicast packet, or a multicast packet for which the VLAN mapping scheme is the same with the above described process.

Figure 6:
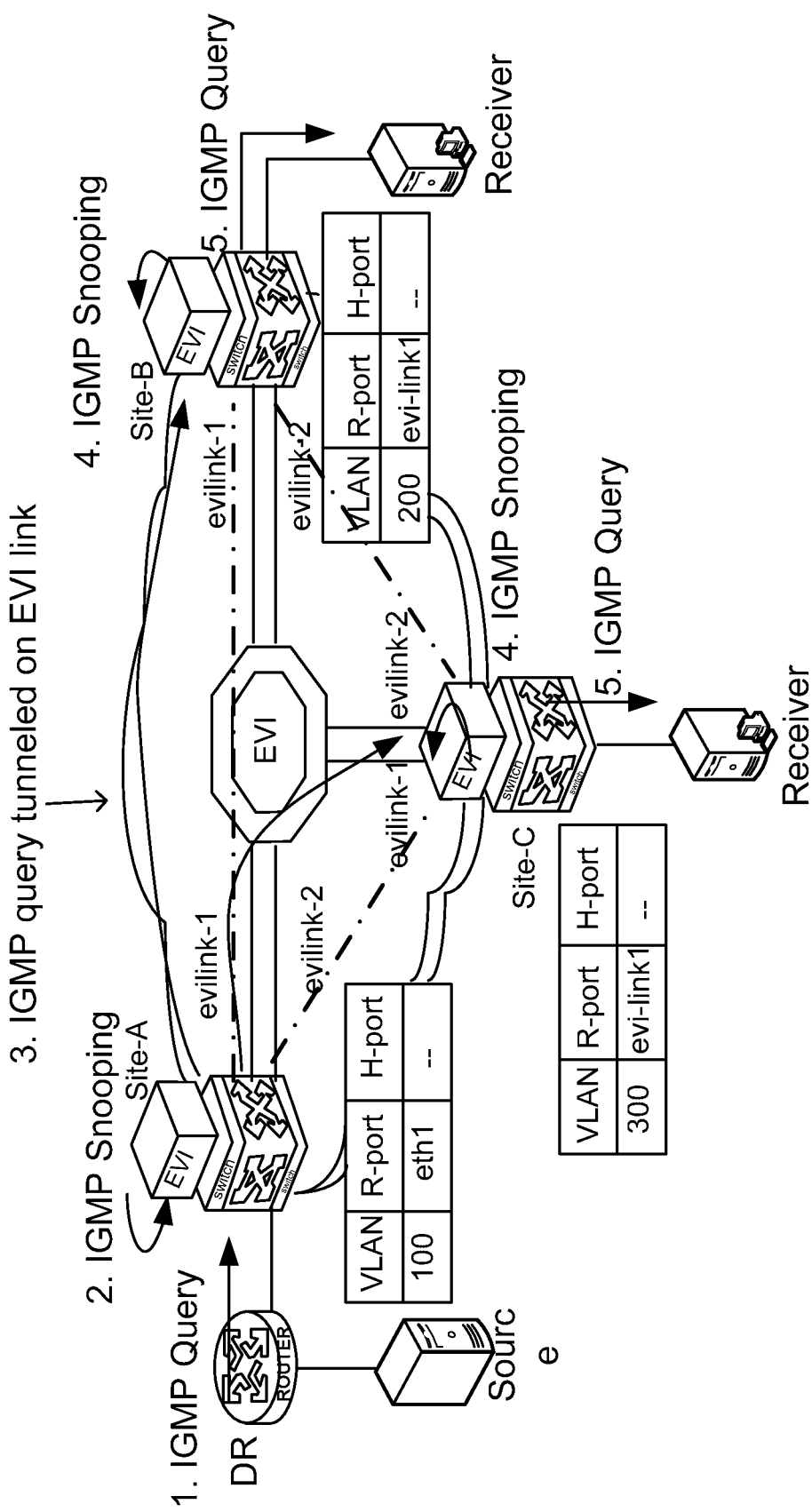
FIG. 6 and FIG. 7 are schematic diagrams illustrating site A joining in a multicast service in accordance with an example of the present disclosure.

As shown in FIG. 6, according to an example, site A may include a multicast device, e.g., a designated router (DR), and an information publishing end (Source), and site B may include an information receiving end (Receiver), and site C may also include a Receiver. In addition, in this example, site A may send packets to site B via evilink1 and may send packets to site C via evilink2.

Figure 12:
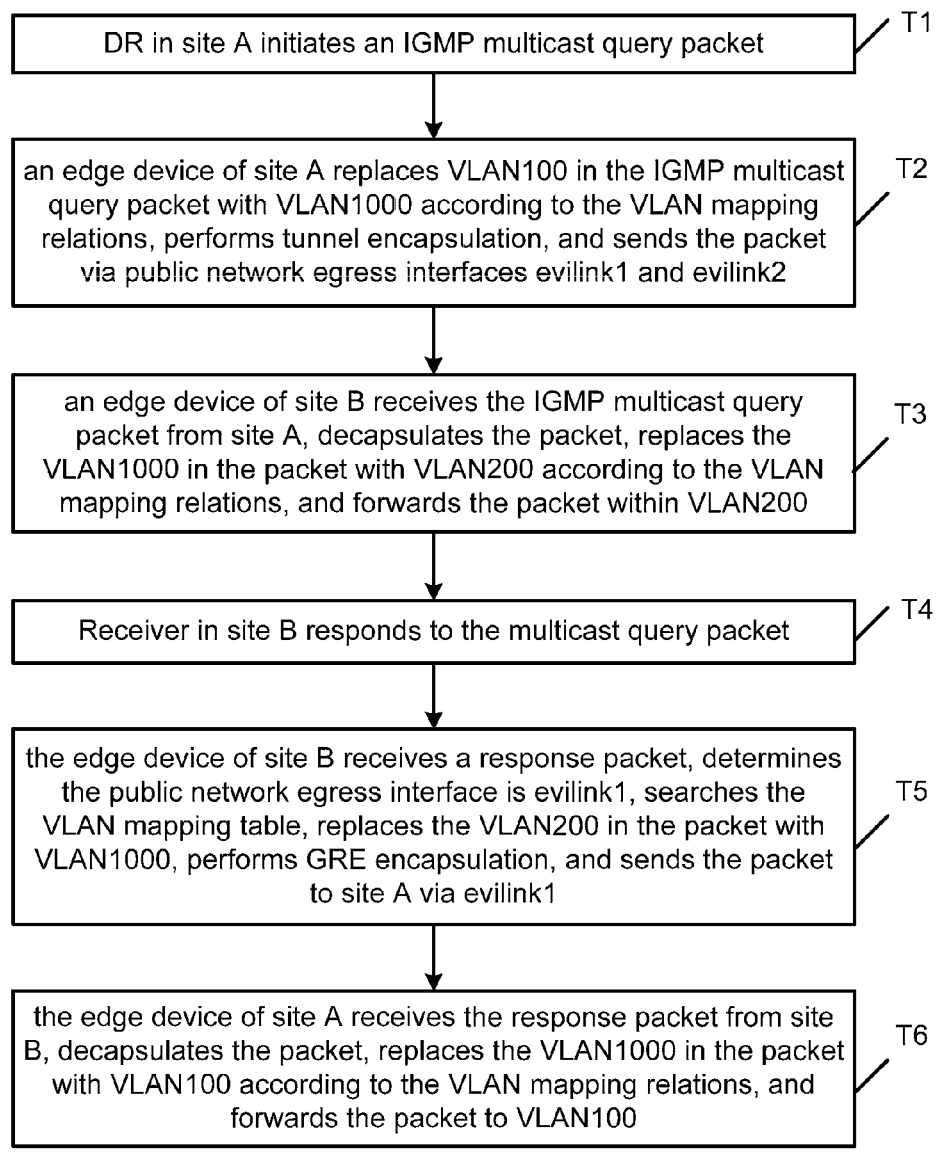
FIG. 12 is flowchart illustrating a process for multicast in accordance with an example of the present disclosure.

The method of participating in a multicast may be as follows as shown in FIG. 12. In T1, the DR in site A may initiate an IGMP multicast query packet. In T2, an edge device of site A may replace VLAN100 in the IGMP multicast query packet with VLAN1000 according to the VLAN mapping relations as shown in Table 1, may perform tunnel encapsulation, and may send the packet via public network egress interfaces evilink1 and evilink2, respectively.

In T3, an edge device of site B may receive the IGMP multicast query packet from site A, may decapsulate the packet, and may replace the VLAN1000 in the packet with VLAN200 according to the VLAN mapping relations as shown in Table 2, and may forward the packet within VLAN200 to deliver the IGMP multicast query packet to the Receiver. Likewise, an edge device of site C may receive the IGMP multicast query packet from site A, may decapsulate the packet, and may replace the VLAN1000 in the packet with VLAN300 according to the VLAN mapping relations as shown in Table 3, and may forward the packet within VLAN300 to deliver the IGMP multicast query packet to the Receiver.

Figure 7:
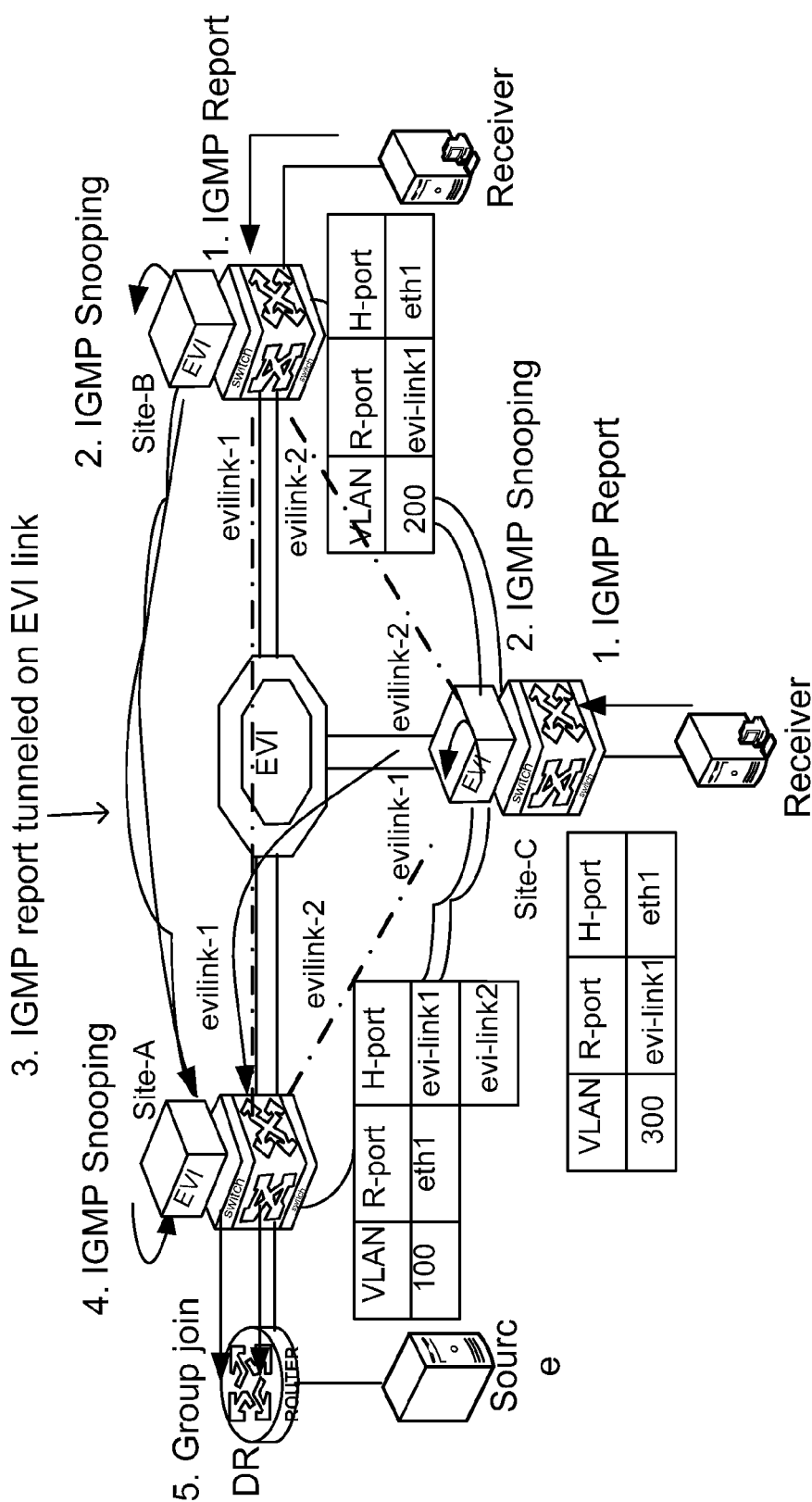

As shown in FIG. 7, the responding process of site B may be as follows. In T4, the Receiver in site B may respond to the multicast query packet. In T5, the edge device of site B may receive a response packet, may determine the public network egress interface is evilink1, may search the VLAN mapping table as shown in Table 2, may replace the VLAN200 in the packet with VLAN1000, may perform GRE encapsulation, and may send the packet to site A via evilink1. In T6, the edge device of site A may receive the response packet from site B, may decapsulate the packet, may replace the VLAN1000 in the packet with VLAN100 according to the VLAN mapping relations as shown in Table 1, and may forward the packet to VLAN100 to deliver the response packet from the Receiver to the DR. The Receiver in site B may thus successfully join in the multicast.

The responding process of site C may be similar to the above, which may result in the Receiver in site C successfully joining in the multicast. As such, the detailed process will not be described again.

In a second example, FIG. 2 is again taken as an example. However, in this example, a different method for configuring the VLAN mapping relations is adopted. In this example, domain IDs may be configured uniformly for each data center, and mapping relations between the domain IDs may be configured. The domain ID may represent the ID of a bridge-domain.

For example, the domain ID mapping relations configured in an edge device of site A may be as shown in Table 4:

TABLE 4

| VLAN | Service | Domain ID |
| --- | --- | --- |
| 100 | Web | 1 |
| 101 | Db | 2 |
| 4000 | Mgnt | 3 |

In the Table 4, the "Service" column lists the service types, the "VLAN" column lists the VLAN ID used in the local site for each service, and the "Domain ID" column lists the ID of a bridge-domain to which each service belongs.

Likewise, the domain ID mapping relations configured in an edge device of site B may be as shown in Table 5:

TABLE 5

| VLAN | Service | Domain ID |
| --- | --- | --- |
| 200 | Web | 1 |
| 201 | Db | 2 |
| 4000 | Mgnt | 3 |

The domain ID mapping relations configured in an edge device of site C may be as shown in Table 6:

TABLE 6

| VLAN | Service | Domain ID |
| --- | --- | --- |
| 300 | Web | 1 |
| 301 | Db | 2 |
| 4000 | Mgnt | 3 |

It should be noted that the above configurations in the edge devices are merely mapping relations between domain IDs instead of VLAN mapping relations, and may not be used directly in packet forwarding. Therefore, in this example, an edge device may need to perform negotiation with a remote site to obtain domain ID mapping relations configured in each edge device, may determine VLAN mapping relations by using the domain ID mapping relations of the local site and the domain ID mapping relations of the remote site, and may send the VLAN mapping relations to a public network egress interface.

Figure 8:
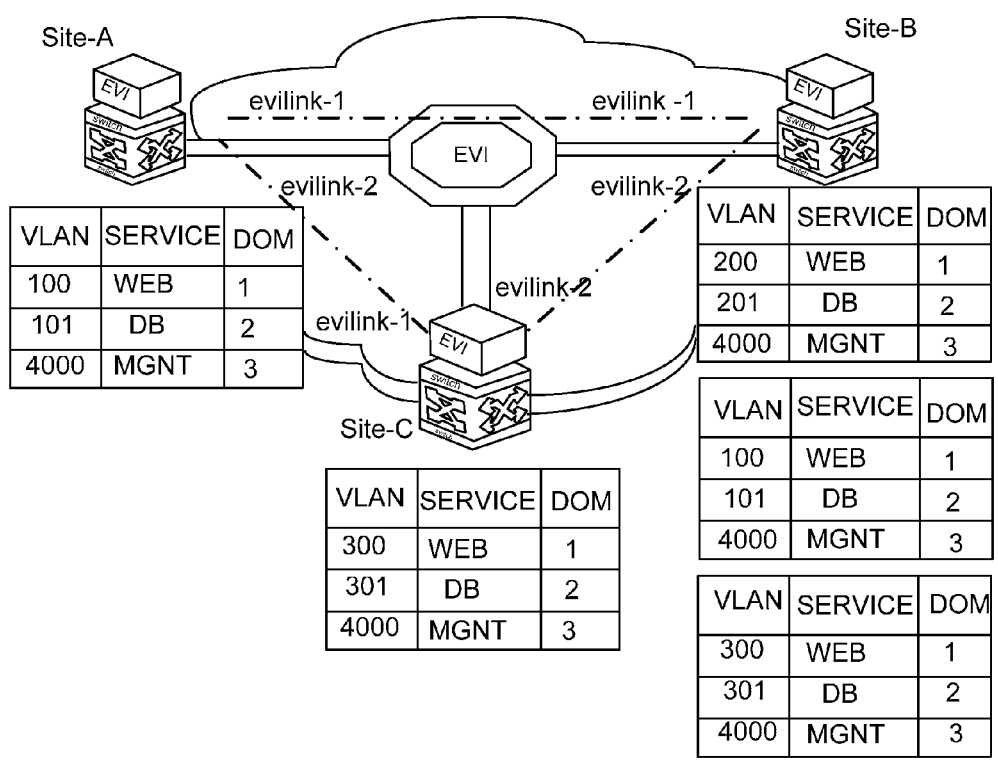
FIG. 8 is a schematic diagram illustrating a domain IDs mapping relations sent to site B in accordance with an example of the present disclosure.

As shown in FIG. 8, domain ID mapping relations configured in the edge devices of sites A, B and C may be as shown in Tables 4-6 respectively and the edge devices of site A and site B may perform negotiation through a protocol such as the ISIS protocol and may send respective domain ID mapping relations to each other. Likewise, negotiation may also be performed between the edge devices of sites A and C and between the edge devices of sites C and B by using the ISIS protocol to exchange respective domain ID mapping relations.

Figure 9:
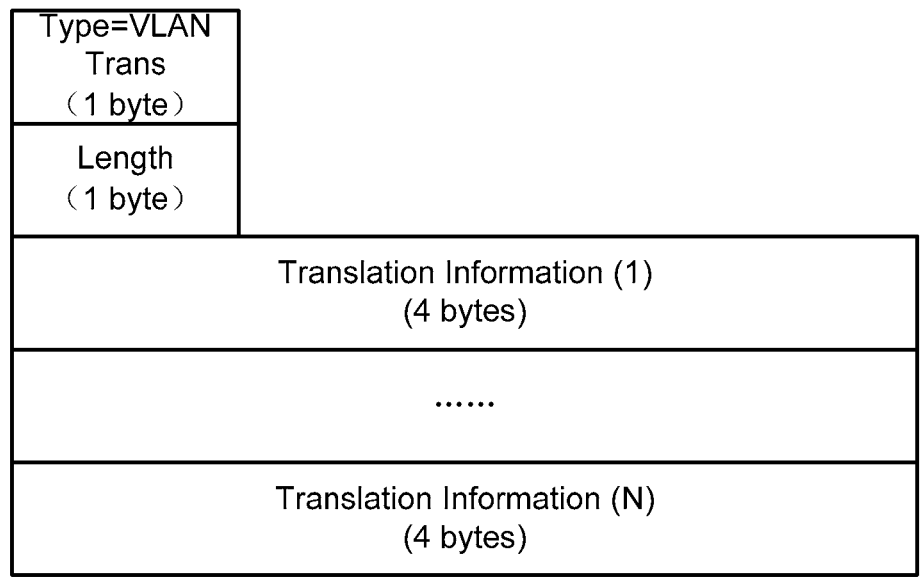
FIG. 9 is a schematic diagram illustrating a format of a sub TLV for delivering a mapping relation between domain IDs in an intermediate system to intermediate system (ISIS) Hello packet in accordance with an example of the present disclosure.

Regarding the manner of sending the domain ID mapping relations, an example introduces a new sub TLV type into a conventional ISIS Hello packet for delivering the domain ID mapping relations. The new sub TLV may adopt the format as shown in FIG. 9 where information of the domain ID mapping relations is included in a Translation Information (N) structure. The structure may include N units, each of which may include an "Extended VLAN" field of two bytes for delivering a VLAN ID and a "Bridge-Domain" field of two bytes for delivering a domain ID corresponding to the VLAN ID. In this way, the edge devices of site A and site C may be enabled to send respective domain ID mapping relations to the edge devices of site B.

Then, the edge device of site B may obtain the mapping relations of the three domain IDs as shown in FIG. 8. By using the mapping relations of the three domain IDs, mapping relations between the VLANs may be identified.

In VLAN200 corresponding to Domain ID=1, the VLAN ID in packets passing through public network interface evilink1 is replaced with VLAN100.

In VLAN201 corresponding to Domain ID=2, the VLAN ID in packets passing through public network interface evilink1 is replaced with VLAN101.

In VLAN4000 corresponding to Domain ID=3, the VLAN ID in packets passing through public network interface evilink1 is replaced with VLAN4000.

The VLAN mapping relations may be denoted as shown in Table 7:

TABLE 7

| Domain ID | VLAN | MAP-VLAN |
|---|---|---|
| 1 | 200 | 100 |
| 2 | 201 | 101 |
| 3 | 4000 | 4000 |

The VLAN mapping relations as shown in Table 7 may be delivered to the public network interface evilink1.

Likewise, the VLAN mapping relations delivered to public network interface evilink2 may be as shown in Table 8:

TABLE 8

| Domain ID | VLAN | MAP-VLAN |
|---|---|---|
| 1 | 200 | 300 |
| 2 | 201 | 301 |
| 3 | 4000 | 4000 |

In the above example, the edge device of site B may store a relation that associates evilink1 with Table 7 and a relation that associates evilink2 with Table 8. Therefore, the site on the remote communicating end may be identified after the public network interface is determined, and the VLAN mapping relation table on the remote communicating end, which records mapping relations between VLAN IDs used in the local site and VLAN IDs used in the site, may be determined.

In other examples, the VLAN mapping relations may be stored in the edge devices in other forms, e.g., the VLAN mapping relations of all public network interfaces may be stored in one list, or may be stored in multiple lists according to service types or domain IDs or local VLAN IDs, etc. For example, VLAN mapping relations stored in site B may be as shown in Table 9.

TABLE 9

| Public network interface | Domain ID | VLAN | MAP-VLAN |
|---|---|---|---|
| evilink1 | 1 | 200 | 100 |
| evilink1 | 2 | 201 | 101 |
| evilink1 | 3 | 4000 | 4000 |
| evilink2 | 1 | 200 | 300 |
| evilink2 | 2 | 201 | 301 |
| evilink2 | 3 | 4000 | 4000 |

In another example, VLAN mapping relations in the edge device of site B may also be stored as shown in Tables 10 to 12.

TABLE 10

| Public network interface | Domain ID | VLAN | MAP-VLAN |
|---|---|---|---|
| evilink1 | 1 | 200 | 100 |
| evilink2 | 1 | 200 | 300 |

TABLE 11

| Public network interface | Domain ID | VLAN | MAP-VLAN |
|---|---|---|---|
| evilink1 | 2 | 201 | 101 |
| evilink2 | 2 | 201 | 301 |

TABLE 12

| Public network interface | Domain ID | VLAN | MAP-VLAN |
|---|---|---|---|
| evilink1 | 3 | 4000 | 4000 |
| evilink2 | 3 | 4000 | 4000 |

In the above tables, the domain ID column or the VLAN column may be omitted. In an example, the Domain ID column and VLAN column may be omitted, and a relation that associates a domain ID or a local VLAN ID with a table recording a VLAN ID of a remote communicating end may be stored.

It may be seen that the VLAN mapping relations in an edge device may be stored in any form, and is not limited in the present disclosure.

Edge devices may perform MAC study before performing communications. The study of local MAC addresses may follow a conventional process, which is not described further herein.

When an edge device has studied local MAC addresses in a local VLAN for a service, the control module 101 may determine information to be sent, which may include a VLAN ID used in the local site and local MAC addresses, may replace a VLAN ID used in the local site in the information with a domain ID corresponding to the VLAN ID according to the domain ID mapping relations, and may send the information to a remote site via the interface module 104.

After an edge device receives MAC information sent by a remote site, the control module 101 may specify a VLAN ID used in the local site corresponding to a domain ID in the received information by using the domain ID mapping relations. The edge device may also deliver the MAC information of the remote site to a VLAN corresponding to the VLAN ID used in the local site.

It may be seen that the above MAC study process is similar to that of the first example provided above. Since domain IDs are set for edge devices in this example, when sending information to a remote site, an edge device may replace a VLAN ID in the information to be sent with a domain ID according to a domain ID mapping relation set in the edge device. Correspondingly, after receiving the MAC information, a remote site may identify a VLAN corresponding to the domain ID in the MAC information according to a Domain ID mapping relation set in the remote site, and may then send the MAC information into the VLAN.

Figure 13A:
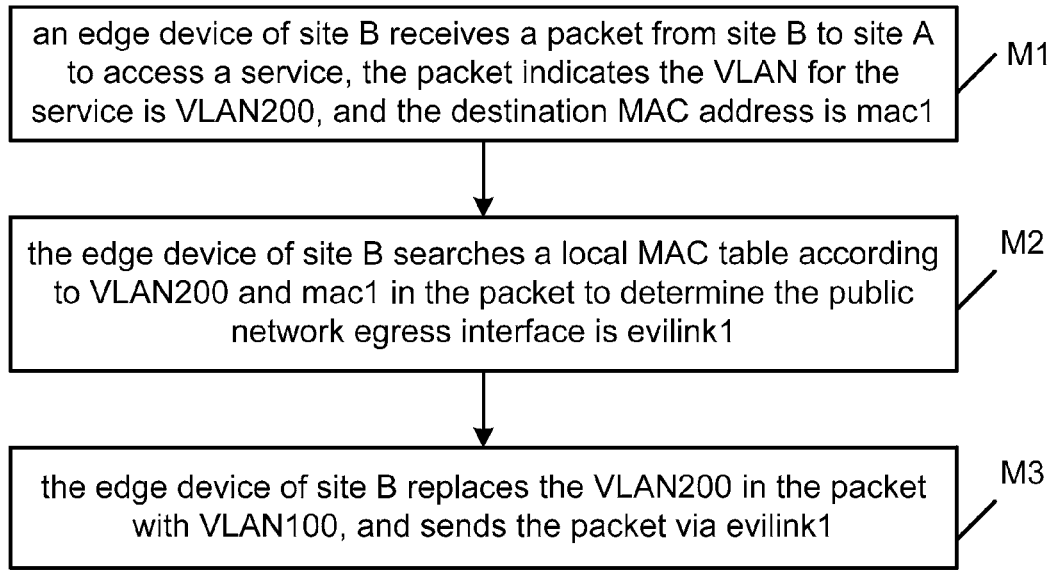
FIG. 13a and FIG. 13b are flowcharts illustrating a process performed in site B and in site A respectively when site B seeks to access site A in a service in accordance with an example of the present disclosure.

Hence, service interconnections between the sites may be realized. As shown in FIG. 8, in an example in which site B seeks to access site A in a web service, the method may include the following procedures as shown in FIG. 13*a*. In M1, an edge device of site B may receive a packet from site B to site A to access a service. In this example, the packet indicates the VLAN for the service is VLAN200, and the destination MAC address is mac1.

In M2, the edge device of site B may search a local MAC table according to VLAN200 and mac1 in the packet to determine the public network egress interface is evilink1. As described above, the public network egress interface is a logic interface, which may include information of a tunnel header, a public network egress interface and so on.

In M3, the edge device of site B may replace the VLAN200 in the packet with VLAN100, which corresponds to VLAN200 in the VLAN mapping relations as shown in Table 7.

In this procedure, an edge device of site B may obtain public network egress interface evilink1 through the procedure M2. The edge device of site B may also search for a VLAN mapping relation table corresponding to evilink1 to obtain the VLAN mapping relation table corresponding to evilink1 is Table 7, and may thus use the VLAN mapping relations in Table 7 when replacing the VLAN ID in procedure M3.

In practice, tunnel encapsulation may be performed before the packet is transmitted to the public network. Therefore, the packet in which the VLAN ID has been replaced may be processed through tunnel encapsulation before being sent to site A through the public network egress interface evilink1. The tunnel encapsulation may be implemented by any conventional technique, such as GRE tunnel encapsulation.

Figure 13B:
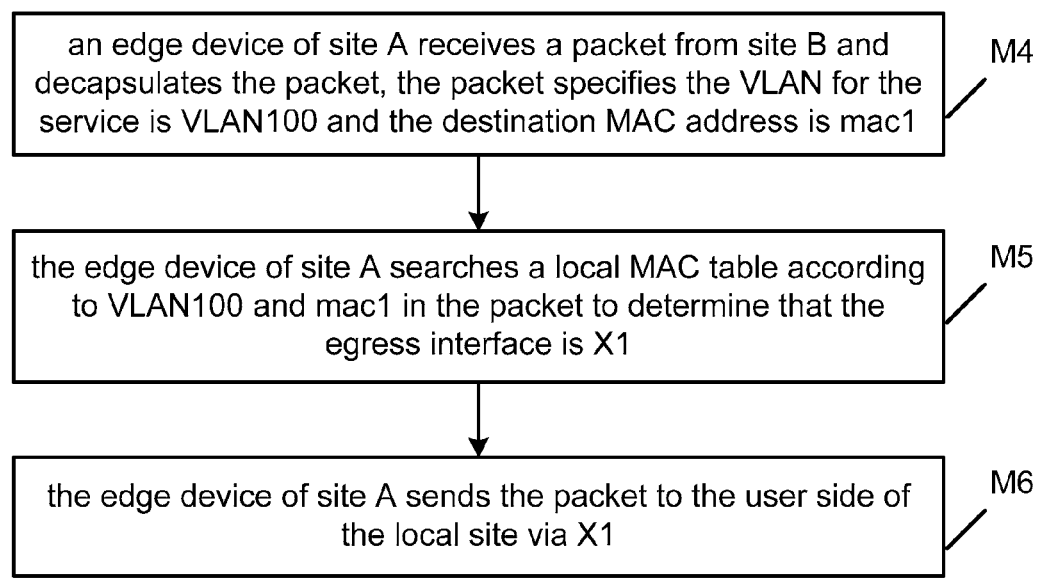

Accordingly, the process of an edge device of site A receiving an access of site B for the web service may be as follows as shown in FIG. 13*b*. In M4, an edge device of site A may receive a packet from site B and may decapsulate the packet. In this example, the packet specifies the VLAN for the service is VLAN100, and the destination MAC address is mac1. In M5, the edge device of site A may search a local MAC table according to VLAN100 and mac1 in the packet to determine that the egress interface is X1.

When the packet is sent by remote site B through the public network to site A in this procedure, the VLAN ID used in transmission in the public network (VLAN100) is the VLAN ID used in site A (which is the remote communicating end of site B) for the service (VLAN100). Therefore an edge device of site A may not have to perform VLAN mapping.

In M6, the edge device of site A may send the packet to the user side of the local site (private network) via the egress interface X1.

Figure 14:
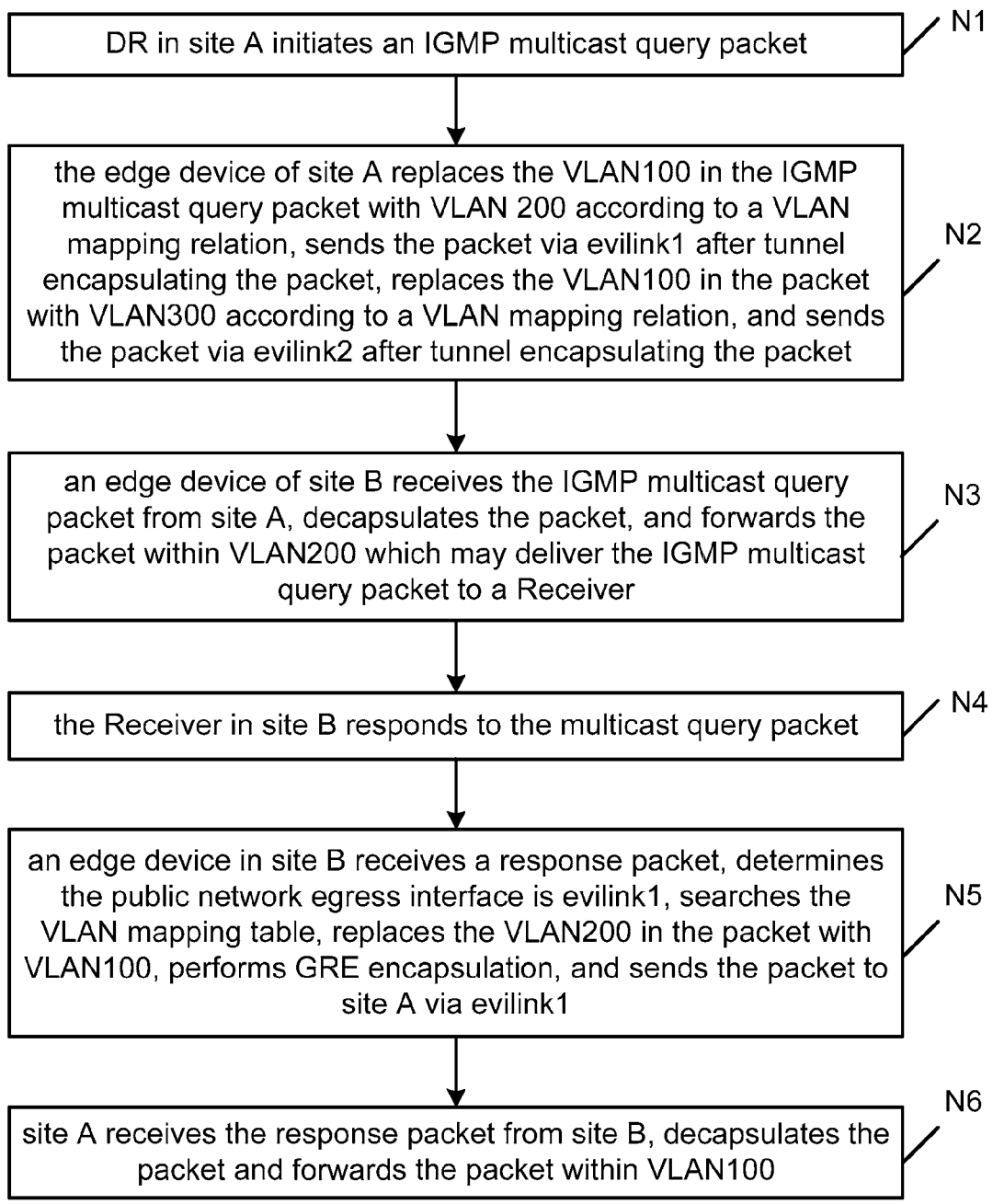
FIG. 14 is flowchart illustrating a process for multicast in accordance with an example of the present disclosure.

In practice, the packet may be a unicast packet or a multicast packet. The manner for multicast forwarding is similar to that of the first example above (see FIG. 6 and FIG. 7), but the VLAN mapping manner may be different. The method may include the following procedures as shown in FIG. 14.

In N1, a DR in site A may initiate an IGMP multicast query packet. In N2, the edge device of site A may replace the VLAN100 in the IGMP multicast query packet with VLAN 200 according to a VLAN mapping relation. The edge device of site A may also send the packet via evilink1 after tunnel encapsulating the packet, may replace the VLAN100 in the packet with VLAN300 according to a VLAN mapping relation, and may send the packet via evilink2 after tunnel encapsulating the packet.

In this procedure, VLAN mapping relations corresponding to evilink1 in the edge device of site A may be as shown in Table 13.

TABLE 13

| Domain ID | VLAN | MAP-VLAN |
|---|---|---|
| 1 | 100 | 200 |
| 2 | 101 | 201 |
| 3 | 4000 | 4000 |

VLAN mapping relations corresponding to evilink2 in the edge device of site A may be as shown in Table 14.

TABLE 14

| Domain ID | VLAN | MAP-VLAN |
|---|---|---|
| 1 | 100 | 300 |
| 2 | 101 | 301 |
| 3 | 4000 | 4000 |

In N3, an edge device of site B may receive the IGMP multicast query packet from site A, may decapsulate the packet, and may forward the packet within VLAN200 which may deliver the IGMP multicast query packet to a Receiver. Likewise, an edge device of site C may receive the IGMP multicast query packet from site A, may decapsulate the packet, and may forward the packet within VLAN300m which may deliver the IGMP multicast query packet to a Receiver.

The responding process of site B may include the following procedures. In N4, the Receiver in site B may respond to the multicast query packet. In N5, an edge device in site B may receive a response packet, may determine the public network egress interface is evilink1, may search the VLAN mapping table as shown in Table 7, may replace the VLAN200 in the packet with VLAN100, may perform GRE encapsulation, and may send the packet to site A via evilink1. In N6, site A may receive the response packet from site B, decapsulates the packet. Site A may also forward the packet within VLAN100, which delivers the packet returned by the Receiver to the DR. Thus, the Receiver in site B may successfully join in the multicast.

The responding process of site C is similar to the above, which makes the Receiver in site C successfully join in the multicast, and the detailed process will not be described again.

Figure 10:
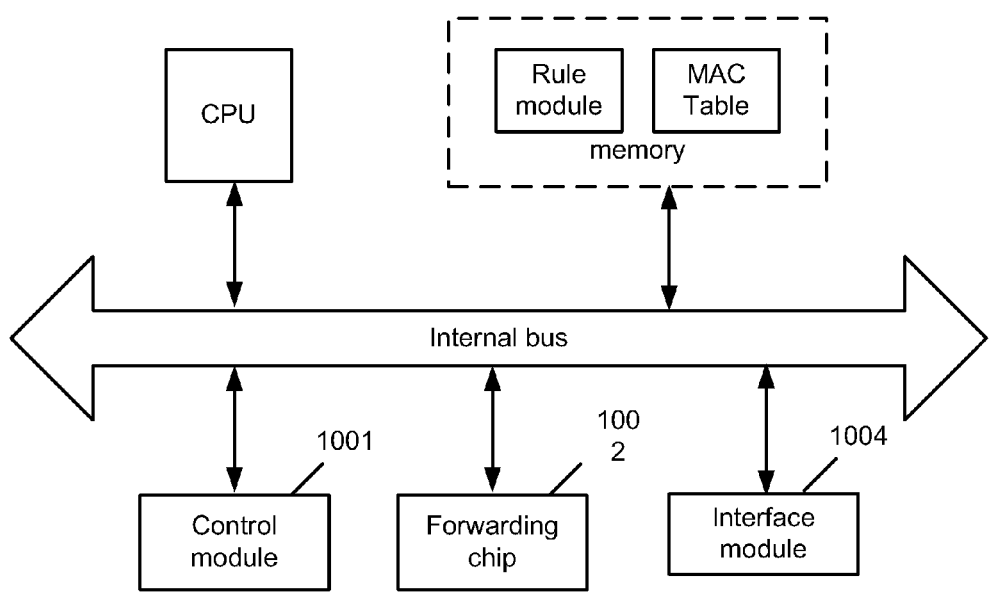
FIG. 10 is a schematic diagram illustrating a structure of an edge device in accordance with an example of the present disclosure.

FIG. 10 is a schematic diagram illustrating a structure of an edge device in accordance with an example of the present disclosure. As shown in FIG. 10, an edge device may include a control module 1001, a forwarding chip 1002, a rule module, an interface module 1004, an internal bus, and a memory. The rule module is in the memory, which may also store a MAC table. Functions of the control module 1001, the forwarding chip 1002, the rule module, and the interface module 1004 may be respectively similar to the above-described control module 101, forwarding chip 102, rule module 103, and the interface module 104. The internal bus may implement interconnection between the modules.

The edge device may be a router, which may perform functions of the above-described edge device. For example, an EVI network may be constructed by using identical routers, and those routers deployed at the edge of the EVI network may have a certain parameter configured to be a pre-defined value or have a certain function enabled so as to work in accordance with the above described methods as an edge device described above.

It should be understood that in the above processes and structures, not all of the procedures and modules are necessary. Certain procedures or modules may be omitted according to the needs. The order of the procedures is not fixed, and may be adjusted without departing from a scope of the examples disclosed herein. The modules are defined based on function simply for facilitating description. In implementation, a module may be implemented by multiple modules, and functions of multiple modules may be implemented by the same module. The modules may reside in the same device or distribute in different devices.

A machine-readable storage medium is also provided, which is to store instructions to cause an edge device to execute a method as described herein. Specifically, a system or apparatus having a storage medium that stores machine-readable program instructions for implementing functions of any of the above examples and which may make the system or the apparatus (or CPU or MPU) read and execute the program instructions stored in the storage medium.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for forwarding packets in an edge device, wherein the edge device is applicable in a system where layer-2 interconnections between sites are implemented by virtual links, said method comprising:
    the edge device searching a media access control (MAC) table to obtain information of a public network egress interface for a packet which is to be sent from a local site to a remote site to access a service;
    configuring a first domain ID mapping relation table in the edge device, wherein each item of the first domain ID mapping relation table comprises: a service type of a service, a VLAN ID used in the local site for the service, and a domain ID of the service;
    negotiating, by the edge device, with the remote site to obtain a second domain ID mapping relation table configured in a remote site;
    identifying, by the edge device, at least one VLAN mapping relation by using the first domain ID mapping relation table of the local site and the second domain ID mapping relation table of the remote site to obtain a VLAN mapping relation table, and delivering the VLAN mapping relation table to the public network egress interface;
    searching in a virtual local area network (VLAN) mapping relation table, identifying a VLAN corresponding to the service in the remote site by using the VLAN ID used in the local site and the domain ID and replacing a VLAN ID in the packet with a VLAN ID of the VLAN in the remote site; and
    sending the packet in which the VLAN ID has been replaced to the remote site by using the information of the public network egress interface.

2. The method of claim 1, further comprising:
    configuring the VLAN mapping relation table in the edge device statically;
    delivering the configured VLAN mapping relation table to a public network egress interface, wherein each item of the VLAN mapping relation tables comprises: a service type of a service, a VLAN ID used in the local site for the service, a VLAN ID for transmitting packets of the service in the public network; and
    wherein searching in the virtual local area network (VLAN) mapping relation table and replacing the VLAN ID in the packet with a VLAN ID that is used to transmit a packet of the service in a public network further comprise,
        searching the statically configured VLAN mapping relation table and replacing the VLAN ID in the packet with the VLAN ID used for transmitting a packet of the service in the public network.

3. The method of claim 2, further comprising:
    searching, by the edge device, in the VLAN mapping relation table after receiving a second packet sent by a remote site to the local site to access a second service and replacing a VLAN ID in the packet with a VLAN ID used in the local site for the second service; and
    sending the second packet in which the VLAN ID has been replaced to the local site.

4. The method of claim 3, further comprising:
    determining, by the edge device, information to be sent that comprises a VLAN ID used in the local site for a service and at least one local MAC address after having studied the at least one local MAC address in a local VLAN corresponding to the service;
    searching in the VLAN mapping relation table, replacing the VLAN ID used in the local site in the information with a VLAN ID used for transmitting packets of the service in the public network, and sending the information to a remote site; and
    after receiving MAC address information sent by the remote site, searching, by the edge device, in the VLAN mapping relation table, determining a VLAN ID used in the local site corresponding to a VLAN ID used for transmitting packets of a second service in the public network in the received MAC address information, and sending the MAC address information from the remote site to a VLAN corresponding to the VLAN ID used in the local site.

5. The method of claim 1, further comprising:
receiving, by the edge device, a second packet sent by a remote site to access a service, and sending the packet to the local site directly according to a VLAN ID in the packet.

6. The method of claim 5, further comprising:
determining, by the edge device, information to be sent that comprises a VLAN ID used in the local site for a service and at least one local MAC address after having studied the at least one local MAC address in a local VLAN corresponding to the service, replacing the VLAN ID used in the local site in the information with a domain ID corresponding to the VLAN ID by using the first domain ID mapping relation table, and sending the information to a remote site; and after receiving MAC address information sent by a remote site, specifying a VLAN ID used in the local site corresponding to a domain ID in the received information according to the first domain ID mapping relation table and delivering the MAC address information from the remote site to a VLAN corresponding to the VLAN ID used in the local site.

7. An edge device applicable in a system where layer-2 interconnections between sites are implemented by virtual links, the edge device comprising:
a forwarding chip to search a media access control (MAC) table to obtain information of a public network egress interface for a packet which is to be sent from a local site to a remote site to access a service;
a first domain ID mapping relation table that is configured in the edge device, wherein each item of the first domain ID mapping relation table comprises: a service type of a service, a VLAN ID used in the local site for the service, and a domain ID of the service;
a control module to determine the VLAN mapping relation table by using the first domain ID mapping relation table configured in the edge device and a second domain ID mapping relation table configured in a remote site, and deliver the VLAN mapping relation table to the public network egress interface and search in a virtual local area network (VLAN) mapping relation table in the rule module and replace a VLAN ID in the packet with a VLAN ID used for transmitting a packet of the service in a public network through identification of a VLAN corresponding to the service in the remote site by using the VLAN ID used in the local site and the domain ID and replacement of the VLAN ID in the packet with a VLAN ID of the VLAN in the remote site;
a rule module to store the VLAN mapping relation table, each item of which associates a VLAN ID used in the local site for a service with a VLAN ID used for transmitting packets of the service in the public network; and
a interface module to send the packet in which the VLAN ID has been replaced to the remote site by using the information of the public network egress interface.

8. The edge device of claim 7, wherein the VLAN mapping relation table is statically configured in the rule module, and each item of the VLAN mapping relation table comprises a service type of a service, a VLAN ID used in the local site for the service, and a VLAN ID used for transmitting the service in the public network;

wherein the control module is further to send the VLAN mapping relation table to a public network egress interface; and wherein the control module is to search in the statically configured VLAN mapping relation table and replace the VLAN ID in the packet with the VLAN ID used for transmitting packets of the service in the public network.

9. The edge device of claim 8, wherein:
the forwarding chip is further to search in the VLAN mapping relation table after the interface module has received a second packet sent by a remote site to the local site to access a second service, and to replace a VLAN ID in the packet with a VLAN ID used in the local site for the second service; and the interface module is further to send the second packet in which the VLAN ID has been replaced to the local site.

10. The edge device of claim 9, wherein:
the control module is further to determine information to be sent that comprises a VLAN ID used in the local site for a service and at least one local MAC address after having studied the at least one local MAC address in a local VLAN corresponding to the service, search in the VLAN mapping relation table, replace a VLAN ID used in the local site in the information with a VLAN ID used to transmit packets of the service in the public network, and send the information to a remote site via the interface module; search in the VLAN mapping relation table after the interface module has received MAC address information sent by a remote site, identify a VLAN ID used in the local site corresponding to a VLAN ID used to transmit packets of a service in the public network in the received MAC address information, and send the MAC address information of the remote site within a VLAN corresponding to the VLAN ID used in the local site.

11. The edge device of claim 7, wherein:
the interface module is further to receive a second packet sent by a remote site to access a second service and directly forward the second packet to a local site according to the VLAN ID in the second packet.

12. The edge device of claim 11, wherein:
the control module is further to determine information to be sent that comprises a VLAN ID used in the local site for a service and at least one local MAC address after having studied the at least one local MAC address in a local VLAN corresponding to the service, replace a VLAN ID used in the local site in the information with a domain ID corresponding to the VLAN ID by using the domain ID mapping relation table, and send the information to a remote site via the interface module; identify a VLAN ID used in the local site corresponding to a domain ID in the received MAC address information by using the domain ID mapping relation table after the interface module has received the MAC address information sent by a remote site, and send the MAC address information of the remote site within a VLAN corresponding to the VLAN ID used in the local site.

* * * * *